US010511987B2

(12) United States Patent
Liu et al.

(10) Patent No.: US 10,511,987 B2
(45) Date of Patent: Dec. 17, 2019

(54) METHODS AND APPARATUS RELATED TO ENHANCED MACHINE TYPE COMMUNICATION

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/005,558

(22) Filed: Jun. 11, 2018

(65) Prior Publication Data

US 2019/0090149 A1    Mar. 21, 2019

Related U.S. Application Data

(60) Provisional application No. 62/561,156, filed on Sep. 20, 2017.

(51) Int. Cl.
*H04W 24/10* (2009.01)
*H04W 72/04* (2009.01)
*H04W 4/70* (2018.01)
*H04L 5/00* (2006.01)

(52) U.S. Cl.
CPC ........... *H04W 24/10* (2013.01); *H04L 5/0057* (2013.01); *H04W 4/70* (2018.02); *H04W 72/0453* (2013.01)

(58) Field of Classification Search
CPC ....... H04B 1/406; H04B 1/005; H04B 1/0057
See application file for complete search history.

(56) References Cited

U.S. PATENT DOCUMENTS

2010/0322158 A1* 12/2010 Lee ..................... H04L 5/001
370/329
2017/0251380 A1* 8/2017 Schabel ............... H04W 16/14

OTHER PUBLICATIONS

Itri et al,, "Resource Allocation and Channel Access for PUSCH," 3GPP TSG RAN WG1 Meeting #84bis, R1-162985, Busan, korea, Apr. 11-15, 2016, 4 pgs,, 3rd Generation Partnership Project (Year: 2016).*

(Continued)

*Primary Examiner* — Siming Liu
(74) *Attorney, Agent, or Firm* — Arent Fox, LLP

(57) ABSTRACT

Various features related to eMTC-U deployment are described. In an aspect of the disclosure, an apparatus (e.g., a base station) maybe configured to select a subset of non-anchor channels from a set of available non-anchor channels, where the subset of non-anchor channels may correspond to a bandwidth within an unlicensed band. The apparatus maybe further configured to transmit information indicating the subset of non-anchor channels via an anchor channel. In some configurations, the subset of non-anchor channels maybe selected based on channel measurements performed by the base station or a UE. In one aspect, a UE may receive, from a base station via an anchor channel, information indicating a subset of non-anchor channels selected from a set of available non-anchor channels. The UE may transmit data on one or more non-anchor channels of the subset of non-anchor channels.

26 Claims, 13 Drawing Sheets

(56) References Cited

OTHER PUBLICATIONS

Huawei et al., "New Study Item", 3GPP Draft, RP-162158, 3rd Generation Partnership Project (3GPP), Mobile Competence Centre, 650, Route Des Lucioles, F-06921 Sophia-Antipolis Cedex, France, vol. TSG RAN, No. Vienna, Austria, Dec. 5, 2016-Dec. 8, 2016, Dec. 4, 2016 (Dec. 4, 2016), XP051183586, 6 Pages, Retrieved from the Internet: URL:http://www.3gpp.org/ftp/Meetings_3GPP_SYNC/RAN/Docs/ [retrieved on Dec. 4, 2016].

Huawei: "Summary of Email Discussion [96#49][LTE/eNB-IoT] Multi-PRB RRC Params (Huawei)", 3GPP Draft, R2-1701433_Email_Discussion_on_Multi-PRB_ RRC_Params, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 13, 2017-Feb. 17, 2017, Feb. 12, 2017 (Feb. 12, 2017), XP051212072, 27 Pages, Retrieved from the Internet: URL:http://www.3gpp.org/ftp/Meetings_3GPP_SYNC/RAN2/Docs/ [retrieved on Feb. 12, 2017].

International Search Report and Written Opinion—PCT/US2018/051330—ISA/EPO—Jan. 7, 2019.

\* cited by examiner

METHODS AND APPARATUS RELATED TO ENHANCED MACHINE TYPE COMMUNICATION

CROSS-REFERENCE TO RELATED APPLICATION(S)

This application claims the benefit of U.S. Provisional Application Ser. No. 62/561,156 entitled "METHODS AND APPARATUS RELATED TO ENHANCED MACHINE TYPE COMMUNICATION" filed on Sep. 20, 2017, which is expressly incorporated by reference herein in its entirety.

BACKGROUND

Technical Field

The present disclosure relates generally to communication systems, and more particularly, to methods and apparatus related to enhanced machine type communication (eMTC) in an unlicensed band.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various features related to enhanced machine type communication (eMTC) in an unlicensed band are described. In an aspect, enhanced machine type communication may be performed in a band within the 2.4 GHz band. For example, with a bandwidth of 1.4 MHz for each channel that may be used for communication by eMTC devices, there may be 60 available channels within a 80 MHz bandwidth of the 2.4 GHz band. In accordance with an aspect, a number clean channels out of the total available channels may be selected by a base station for use by eMTC devices in communicating. In accordance with an aspect, to avoid interference in the 2.4 GHz band, maintaining a white list of a number of clean (e.g., having minimum noise/interference) channels is proposed. The clean channels of the white list may be chosen by a base station, e.g., based on channels measurements on channels corresponding to a given bandwidth used for enhanced machine type communications within the 2.4 GHz band, and/or other criteria. In accordance with the features of some configurations, the white list of channels may be signaled by the base station to one or more eMTC devices (e.g., user equipments (UEs)). The available channels corresponding to the given band within the unlicensed 2.4 GHz band used for eMTC may be referred to as non-anchor channels, and a clean subset of the non-anchor channels that may be well suited for use in eMTC data transmission may be signaled to the UEs. In an aspect, an anchor channel having a fixed frequency and known to eMTC devices before system acquisition may be used to provide an indication of the clean subset of the non-anchor channels to the UEs.

In an aspect of the disclosure, a method, a computer-readable medium, and an apparatus are provided. The apparatus (e.g., a base station) may be configured to select a subset of non-anchor channels from a set of available non-anchor channels. In some configurations, the subset of non-anchor channels may correspond to a bandwidth within an unlicensed frequency band. The apparatus may be further configured to transmit information indicating the subset of non-anchor channels via an anchor channel.

In another aspect of the disclosure, a method, a computer-readable medium, and an apparatus are provided. The apparatus (e.g., a UE) may be configured to receive, from a base station via an anchor channel, information indicating a subset of non-anchor channels selected from a set of available non-anchor channels. In some configurations, the subset of non-anchor channels may correspond to a bandwidth within an unlicensed frequency band. The apparatus may be further configured to transmit data on at least one non-anchor channel of the subset of non-anchor channels. In some configurations, the apparatus may be further configured to transmit one or more channel quality reports indicating channel quality of one or more non-anchor channels of the set of available non-anchor channels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
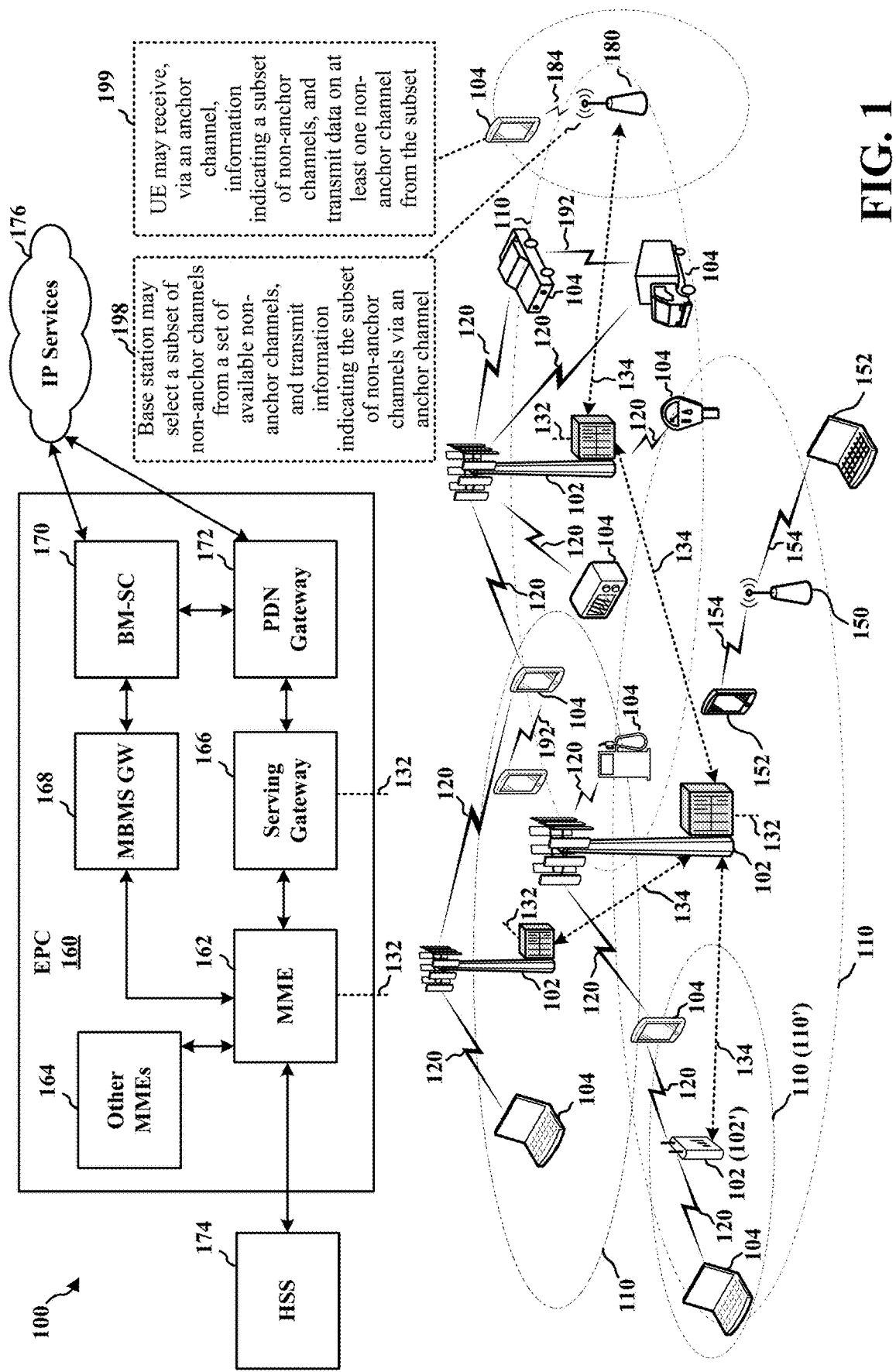
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to select a subset of non-anchor channels from a set of available non-anchor channels based on channel measurements, and transmit information indicating the subset of non-anchor channels via an anchor channel (198), as described in more detail in connection with FIGS. 4-13. In some configurations, the subset of non-anchor channels may correspond to a bandwidth within an unlicensed frequency band. In one configuration, the subset of non-anchor channels may include clean/clear channels that can be used for data transmission (e.g., by eMTC and/or IoT devices such as UEs 104). In one configuration, the anchor channel may have a fixed center frequency and may be known to the eMTC devices before system acquisition. In certain aspects, the UE 104 may be configured to receive information indicating a subset of non-anchor channels selected from a set of available non-anchor channels from the base station 180 via an anchor channel, and transmit data on at least one non-anchor channel of the subset of non-anchor channels (199). Various additional aspects and related features are described in greater detail in connection with FIGS. 4-13.

Figure 2:
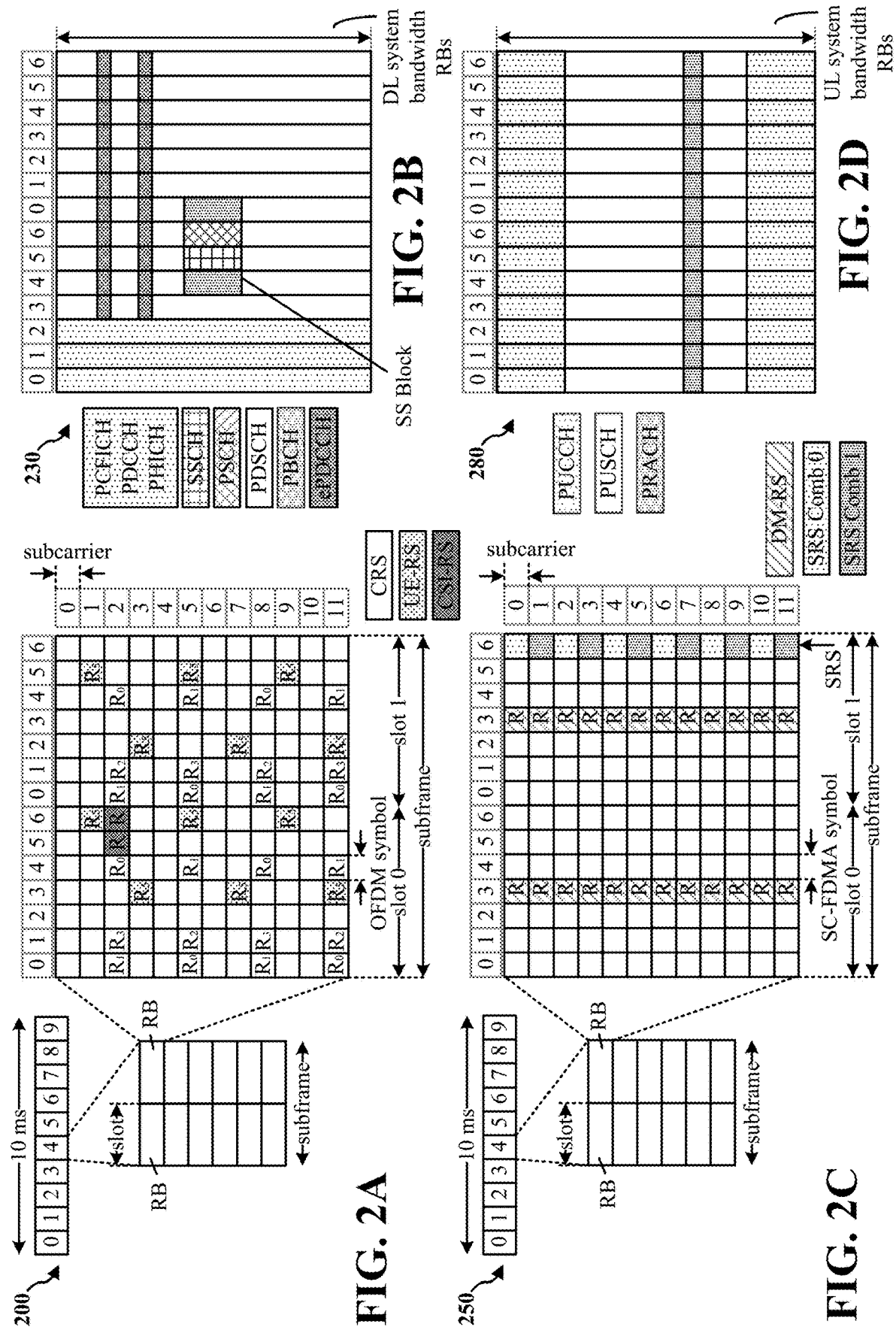
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
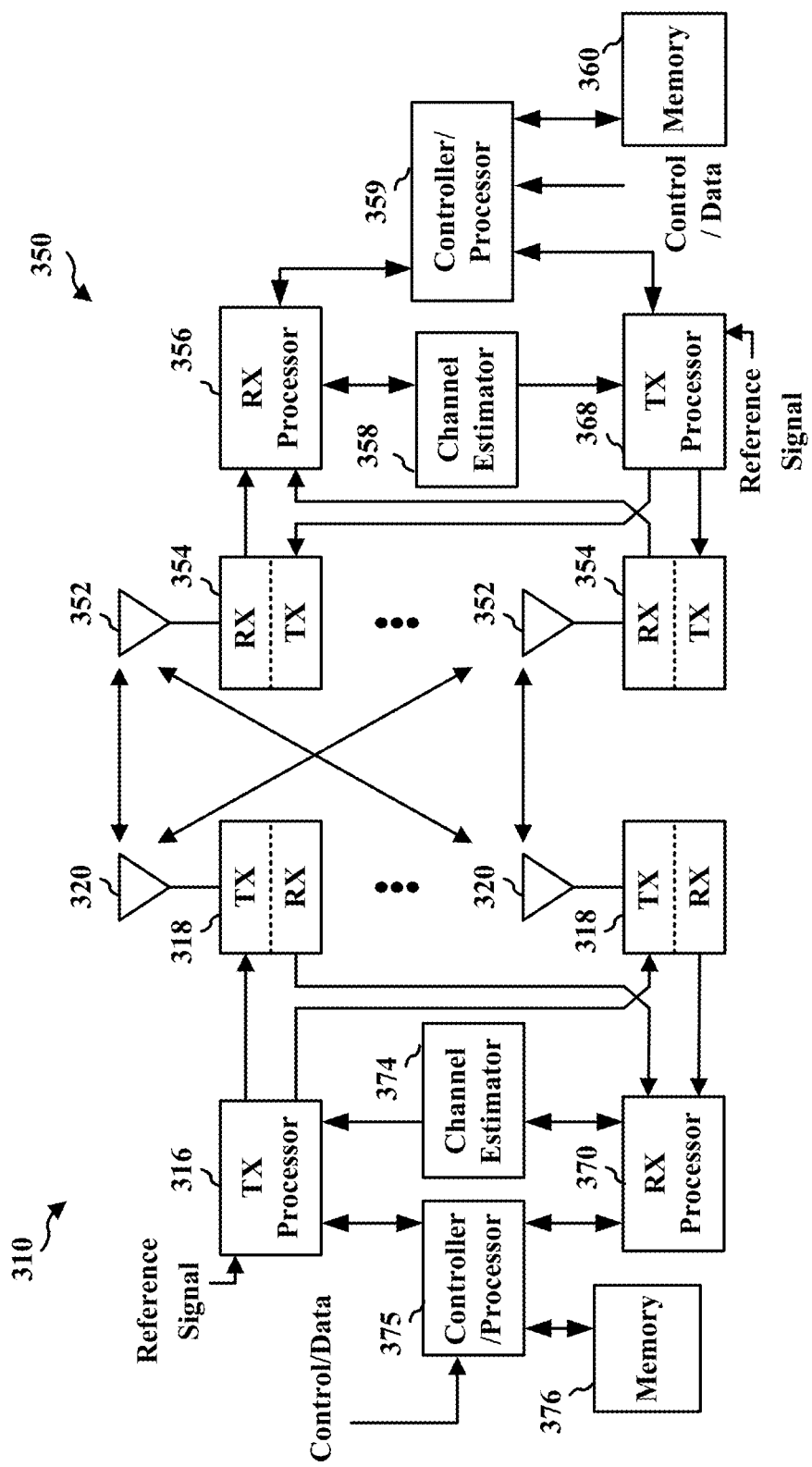
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Enhanced machine type communication-Unlicensed (eMTC-U) is a frequency hopping system in the 2.4 GHz band that may be used for enhanced machine type communications. The unlicensed band may also be used for other types of narrow band communications, for example, for communication by IoT devices in a similar manner. In some implementations, the bandwidth of each channel that may be used for communication by eMTC and/or IoT devices may be 1.4 MHz, and there may be 60 available channels within a 80 MHz bandwidth of the 2.4 GHz band. A minimum number of 15 channels may need to be available for use in order to satisfy regulations. In an aspect, 15/16 channels out of 60 available channels may be selected for operation. The specific numbers of channels may be different in other examples. The example of 60 channels and a subset of 15 or 16 channels is merely one example. In accordance with an aspect, to avoid interference in the 2.4 GHz band, maintaining a white list of a number of clean channels is proposed. The clean channels of the white list may be chosen based on measurements, e.g., channel sensing and channel measurements on channels corresponding to a given bandwidth (e.g., 80 MHz) used for enhanced machine type communications and/or IoT device communications within the 2.4 GHz band. In some configurations, the white list may include 16 clean/clear channels that may be usable for eMTC and/or IoT data transmission. In other examples, the white list may include a different number of clean/clear channels that may be useable for data transmission by eMTC and/or IoT devices.

The available channels that may be used for communication purposes may be referred to as non-anchor channels and a clean subset of the non-anchor channels (e.g., determined based on channel measurements/sensing and/or other criteria) may be used for eMTC data transmission. In an aspect, an anchor channel having a fixed frequency and known to eMTC devices (e.g., UEs 104) before system acquisition may be used to provide initial synchronization. In another aspect, the anchor channel may be detected via a searcher process that detects synchronization signals (e.g., PSS/SSS). For example, via the anchor channel, PSS, SSS, MIB, and possibly some reduced SIB (e.g., reduced SIB1) may be transmitted. The reduced SIB1 may have a reduced number of bits and carry lesser information (compared to legacy SIB1) including, e.g., the channel list, hyperframe number, paging indication, UL/DL configuration, and extended clear channel assessment (eCCA) parameters. In accordance with one aspect, in order to inform the eMTC and/or IoT devices about the non-anchor channels that may be used for data transmission, an indication of the usable 15/16 non-anchor channels from the white list may be provided at initial acquisition via the anchor channel.

Figure 4:
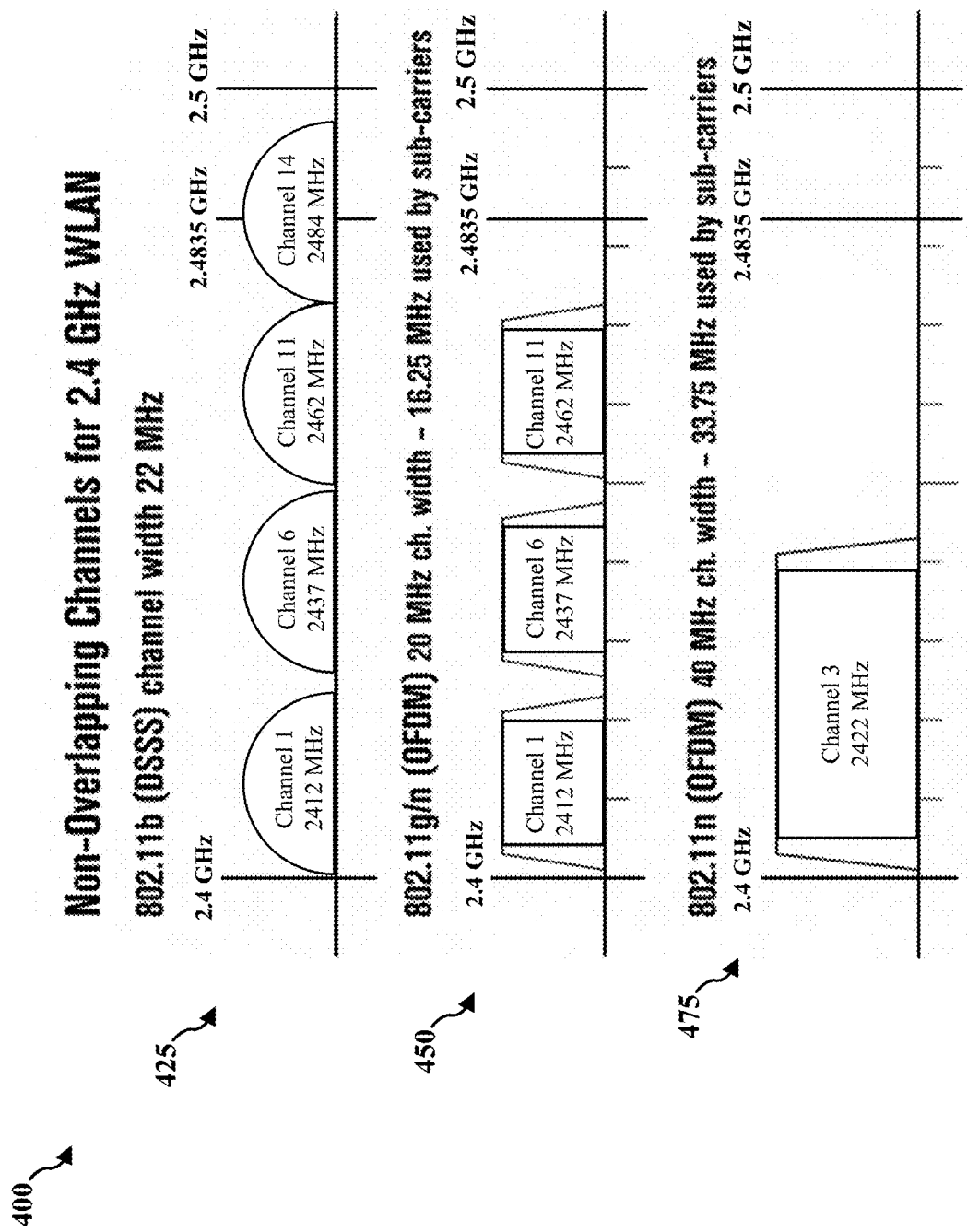
FIG. 4 includes various diagrams illustrating wireless local area network (LAN) channels in the 2.4 GHz band that may be used by devices communicating in accordance with various different 802.11 protocols.

It may be observed that interference for eMTC-U deployed in a factory/industrial environment may mainly come from interference sources such as 802.11 Wi-Fi devices communicating on Wi-Fi channels, 802.15 ZigBee devices and similar inference sources that operate/communicate using one or more channels/bands within the 2.4 GHz frequency band. FIG. 4 is a diagram 400 including various drawings illustrating wireless local area network (LAN) channels in the 2.4 GHz band that may be used by devices operating in accordance with various different 802.11 protocols. Drawing 425 illustrates non-overlapping channels used for 802.11 (b) Direct Sequence Spread Spectrum (DSSS) compliant communications. In the illustrated example, 4 non-overlapping channels are shown including channel 1 with a center frequency of 2412 MHz, channel 6 with a center frequency of 2437 MHz, channel 11 with a center frequency of 2462 MHz, and channel 14 with a center frequency of 2484. Each of the 802.11(b) channels has a channel width of 22 MHZ. Drawing 450 illustrates non-overlapping channels used by devices communicating using 802.11g/n protocol. As can be seen, in the case of 802.11g/n, channels 1, 6 and 11 may be used but the channel width of each channel is 20 MHZ. Drawing 475 illustrates channel 3 having a center frequency of 2422 MHz and a channel width of 40 MHz that may be used with 802.11n (OFDM) protocol. Thus in a deployment with various coexisting 802.11 variations, channels having channel bandwidth of 20/22/40 MHz may be observed. The center frequency of the $i^{th}$ channel may be expressed as 2412+(i−1)*·5 MHz for i=1, 2, ..., 14. In the case of 802.15 ZigBee, channel bandwidth of each channel is 2 MHz and the center frequency of the $k^{th}$ channel is 2405+(k−11)*5 MHz, for k=11, 12, ..., 26. These channels may carry communications that may cause interference to eMTC-U non-anchor channels.

One of the considerations in eMTC-U deployment may be that the white list of non-anchor channels may need to be conveyed (e.g., by a base station to one or more eMTC and/or IoT devices) in less than a 5 ms anchor transmission period, e.g., time period for transmission on the anchor channel. In addition, the payload size of the MIB or reduced SIB may be limited. For example, the MIB payload includes 40 bits, where 16 bits are normally used for cyclic redundancy check (CRC) and 14 bits for SFN, PHICH allocation, and system bandwidth information. While the MIB payload size is limited, if full flexibility of white list indication across 60 available channels is desired, this may require a huge payload, e.g., 60 bits bitmap. If non-anchor channels are limited to 16 channels (e.g., corresponding to the whitelist) out of the 60 available channels, then 47 bits may be needed to provide the indication of the 16 non-anchor channels from an eNB to one or more eMTC and/or IoT devices.

In an aspect, the base station (e.g., eNB 180) may select a subset of non-anchor channels to form the white list from a set of available non-anchor channels (total number of available channels in a given bandwidth within 2.4 GHz). In some configurations, the selection may be based on channel measurements on the available non-anchor channels. The channel sensing/channel measurements may include measuring power on one or more available non-anchor channels to detect noise and/or interference from interfering sources on the available channels. The channel sensing/measurements may allow determining which channels are clear or have the least amount of noise/interference. For example, detection of higher level of power on a channel may indicate that the given channel has a higher level of noise/interference. In some configurations, the channel measurements may be performed by the base station 180. In some other configurations, the channel measurements may be performed by one or more eMTC and/or IoT devices, e.g., UE 104, and reported to the base station 180. For example, one or more UEs may perform channel measurements to detect channel quality on the available non-anchor channels and send one or more channel quality reports (e.g., CQI reports) to the base station 180. In some configurations, the base station 180 and the UEs 104 may both perform channel measurements and the base station 180 may consider both in the selection of the subset of non-anchor channels of the white list. In one configuration, the set of available non-anchor channels may include X non-anchor channels and the subset of non-anchor channels may include Y non-anchor channels, where X and Y are positive integers and Y<X. In one particular configuration, the set of available non-anchor channels includes 60 channels and the subset of non-anchor channels corresponding to the white list includes 16 channels. In some configurations, the base station 180 may indicate the white list of non-anchor channels in the MIB or a reduced SIB transmitted over an anchor channel. As mentioned earlier, the anchor channel may be a fixed frequency channel known to the eMTC devices before system acquisition and the devices may monitor for transmissions on the anchor channel for initial synchronization and acquiring system information. Alternatively, the devices may detect the anchor channel using a search procedure and/or frequency scan.

From the illustrations of wireless channels shown in FIG. 4 and the related discussion above, it may be understood that the interference from Wi-Fi and ZigBee that also operate in the unlicensed band (e.g., 2.4 GHz band) has a larger bandwidth than eMTC-U. For example, it may be noted that the channel bandwidth of channels used for Wi-Fi and ZigBee compliant communications is larger than the channel width of eMTC-U non-anchor channels (e.g., which may be 1.4 MHz in some configurations). In some deployment scenarios where the main interference is from Wi-Fi and ZigBee technologies, it may be better suited to group non-anchor channels into channel groups. Accordingly, in accordance with one aspect, in some configurations a number of contiguous 1.4 MHz channels may be grouped into one channel group. For example, the available non-anchor channels may be partitioned into channel groups, where each channel group may include a same of number (e.g., N) of contiguous 1.4 MHz channels (N being an integer). In some such configurations, the subset of non-anchor channels corresponding to the white list may be part of one or more groups, and the base station 180 may signal the one or more channel groups associated with the non-anchor channels of the white list. To facilitate an understanding, an example of channel grouping is discussed with reference to FIG. 5.

Figure 5:
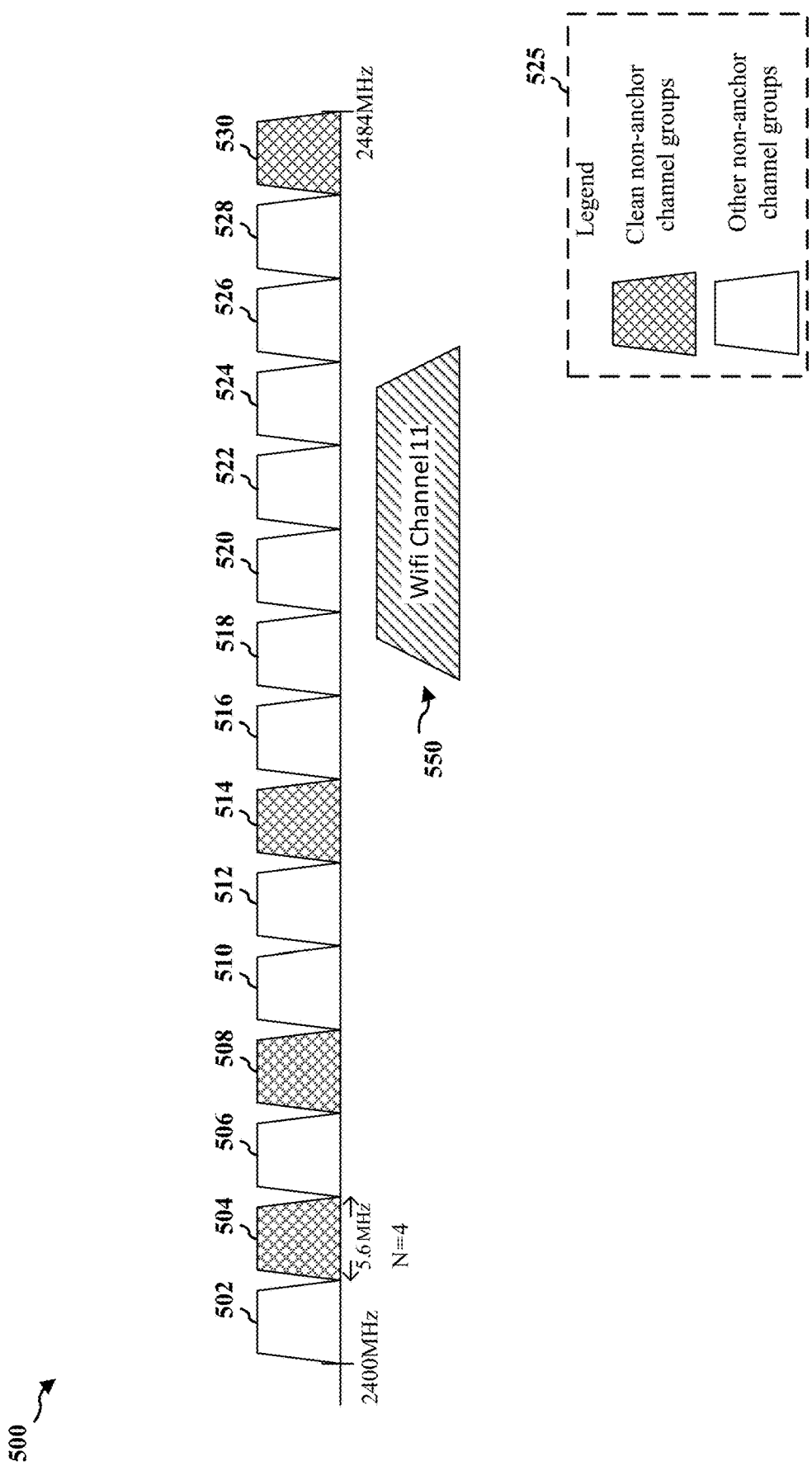
FIG. 5 illustrates a diagram showing an example of forming channel groups of non-anchor channels.

FIG. 5 illustrates a drawing 500 showing an example of channel groups of non-anchor channels. In the illustrated example, the number of contiguous channels in each group N is considered to be=4. Furthermore, consider that there may be 60 available non-anchor channels. Accordingly, in such a case the available non-anchor channels may be grouped into 60/4=15 channel groups (e.g., channel groups 502, 504, 506, 508, 510, 512, 514, 516, 518, 520, 522, 524, 526, 528, and 530), with each channel group including 4 contiguous non-anchor channels and having a channel group bandwidth of 5.6 MHz as illustrated in the figure. In the illustrated example, the channel groups 504, 508, 514, and 530 including the clean non-anchor channels corresponding to the white list are shown with a cross hatching pattern while other remaining non-anchor channel groups are shown with a solid fill without any pattern as indicated by the legend 525. Also illustrated in the figure is the Wi-Fi channel 11 that may cause interference to the channels of one or more channel groups. In some such configurations where channel grouping may be used, signaling the white list of non-anchor anchor channels may include sending an indication of the channel groups including the subset of non-anchor channels corresponding to the white list. This may reduce the number of bits needed to indicate the white list to the eMTC devices. Thus, in the example of FIG. 5, the base station 180 may send information indicating the 4 channel groups 504, 508, 514, and 530 (out of the 15 channel groups) in an anchor channel. In an aspect, signaling 4 channel groups (e.g., 16 channels, with N=4) out of the 15 channel groups may be done using 11 bit. In some configurations, the information indicating the 4 channel groups may be included in the MIB. For example, 11 bits in the payload of the MIB may be used for signaling the 4 channel groups to the eMTC devices. In some configurations, in order to accommodate the 11 bits for indicating the 4 channel groups, the CRC length may be reduced, e.g., to 12 CRC bits instead of 16 bits which are normally used for CRC.

In some eMTC-U deployment scenarios, only Wi-Fi interference may be observed, for example, in deployments where interference from Wi-Fi devices operating in the unlicensed band is the only interference to eMTC-U or where Wi-Fi interference is most dominant and interference/noise from other sources may be negligible. As discussed in connection with FIG. 4, Wi-Fi signals may occupy 22 MHz bandwidth (e.g., channel width of 802.11(b) channels). Thus, in some such deployments, a white list granularity of less than 22 MHz may not be very useful. In such deployment scenarios (e.g., with Wi-Fi only interference), in accordance with one aspect, the white list may be limited to a set of 15/16 contiguous non-anchor channels. One example where the white list may include 15/16 contiguous non-anchor channels that may be used for data transmission, e.g., in Wi-Fi only interference conditions, is discussed with regard to FIG. 6.

Figure 6:
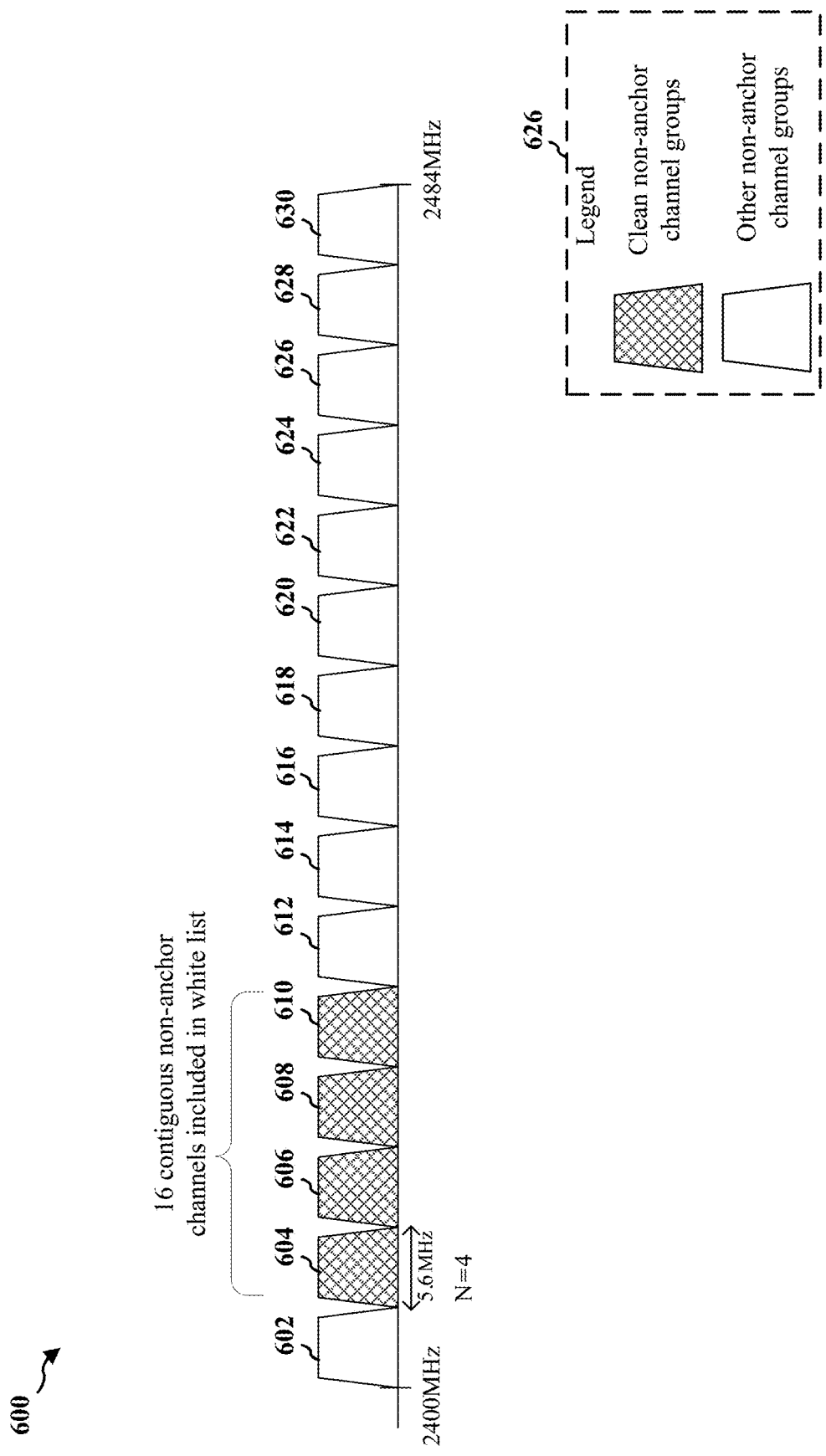
FIG. 6 illustrates a diagram showing multiple channel groups of non-anchor channels, where non-anchor channels of a set of contiguous channel groups constitute a white list of channels.

FIG. 6 is a drawing 600 illustrating an example of 15 channel groups of non-anchor channels with 4 contiguous channel groups including non-anchor channels that constitute the white list in one configuration. For simplicity and consistency, same considerations regarding the total number of non-anchor channels (e.g., 60) and number of non-anchor channels per group (N=4) have been assumed. As discussed above, the grouping illustrated in drawing 600 may be desirable and used in some deployments where only Wi-Fi interference may be observed (e.g., by the base station 180). In the illustrated example, the 15 channel groups include channel groups 602, 604, 606, 608, 610, 612, 614, 616, 618, 620, 622, 624, 626, 628, and 630. The non-anchor channels corresponding to the white list are included in the channel groups 604, 606, 608, 610, with each channel group including 4 contiguous non-anchor channels (assuming N=4). Similar to the previous illustration, in the example illustrated in FIG. 6, the channel groups including the determined clean non-anchor channels are shown with a cross hatching pattern while other remaining non-anchor channel groups are shown with a solid fill without any pattern as indicated by the legend 625. As can be appreciated from FIG. 6, the 16 non-anchor channels corresponding to the white list are associated with the 4 contiguous channel groups 604, 606, 608, 610. Thus, the 4 contiguous channel groups 604, 606, 608, 610 may form the white list of channel groups. With N=4 and with a selection of 4 contiguous channel groups, the total number of channel groups is 15 and only twelve starting positions may be possible for the first channel group in the set of 4 contiguous channel groups of the white list channels. Thus, if the starting position of the first channel group (604) of the white list of channel groups (604, 606, 608, 610) may be signaled by the base station 180 to the eMTC devices, the eMTC devices may determine exactly which non-anchor channels belong to the white list since the eMTC devices may know that the white list includes 16 contiguous channels. In other words, with the above discussed considerations (e.g., N=4 and 60 non-anchor channels in the given implementation) if the subset of non-anchor channels corresponding to the white list include 16 contiguous channels, only twelve starting positions may be possible for the first non-anchor channel (e.g., the first channel of the first channel group 604) of the white list that includes 16 contiguous channels, and signaling the starting position of the first channel of the white list may be sufficient to allow the eMTC devices to determine the usable non-anchor channels assuming the eMTC devices are aware/informed regarding the deployment scenario and/or grouping of the non-channels of the white list. In an aspect, the base station may communicate the starting position of the first non-anchor channel/channel group out of 12 possible starting positions, using 4 bits. The 4 bits indicating the starting position may be included in the MIB or a reduced SIB communicated on an anchor channel.

Figure 7:
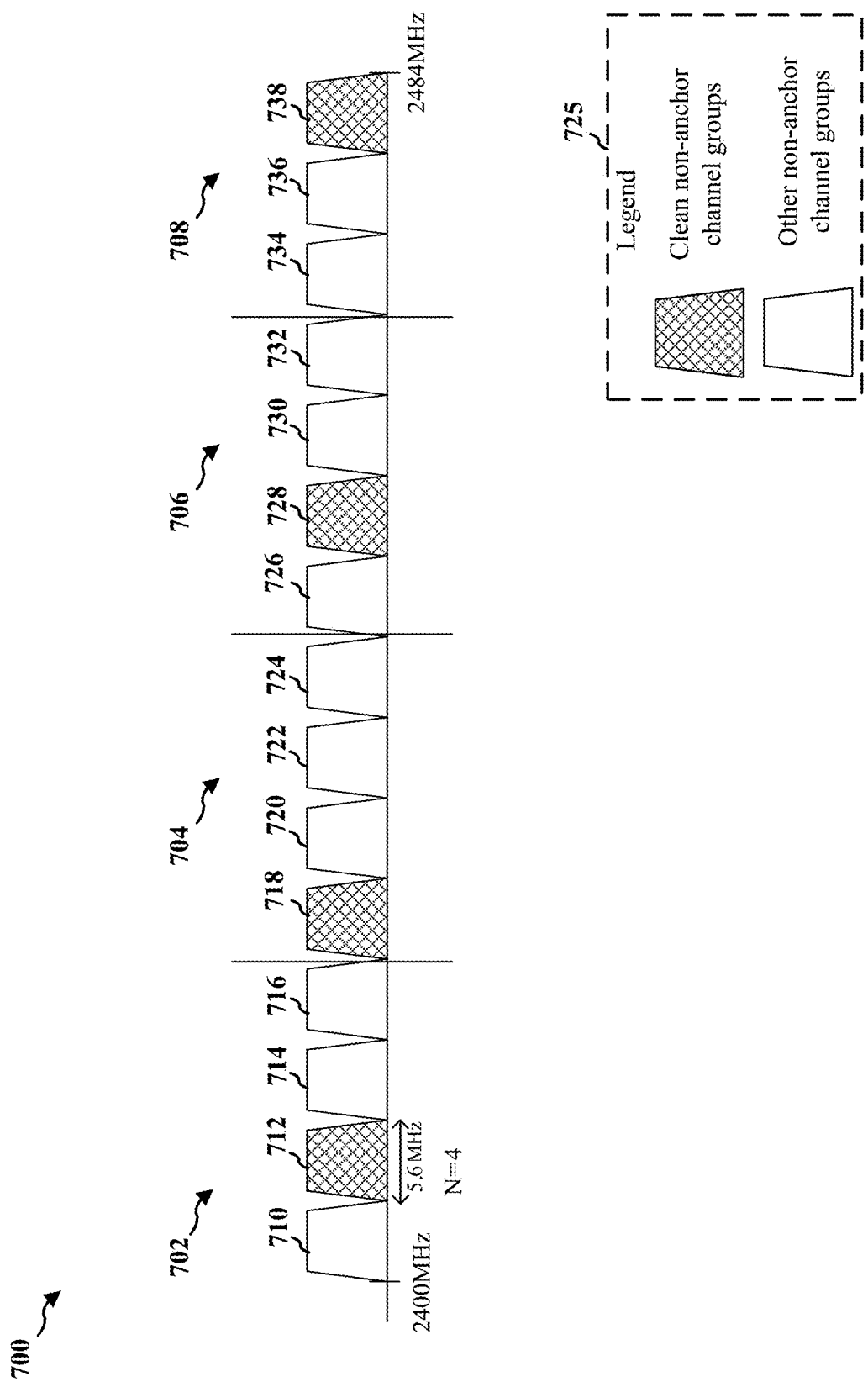
FIG. 7 is a diagram illustrating an example grouping of a set of contiguous channel groups of non-anchor channels into super groups that may be implemented in some configurations.

In another configuration, a white list of channel groups may be formed by selecting each channel group of the white list of channel groups from a number of contiguous channel groups. FIG. 7 is a diagram 700 illustrating an example grouping of M contiguous channel groups of non-anchor channels into super groups that may be implemented (e.g., by the base station 180/310) in some configurations. Assuming N=4, there may be 15 channel groups each having 4 contiguous channels. In the illustrated example, the 15 channel groups include channel groups 710, 712, 714, 716, 718, 720, 722, 724, 726, 728, 730, 732, 734, 736, and 738. As indicated by the legend 725, the channel groups including the determined clean non-anchor channels are shown with a cross hatching pattern while other remaining non-anchor channel groups are shown with a solid fill. In an aspect, the 15 channel groups may be divided into super groups of M contiguous channel groups. FIG. 7 illustrates an example where M=4 so that each super group (except last super group 708) comprises 4 contiguous channel groups, with the different super groups shown separated by the vertical boundary lines in FIG. 7. M may be any integer number of contiguous channel groups, the example of M=4 is merely one example. For example, as illustrated, a first super group 702 may include 4 contiguous channel groups 710, 712, 714, and 716, a second super group 704 may include 4 contiguous channel groups 718, 720, 722, and 724, a third super group 706 may include 4 contiguous channel groups 726, 728, 730, and 732, and the last super group 708 may include 3 channel groups 734, 736, and 738 as shown. In an aspect, the white list of channel groups (e.g., including 4 channel groups) may be formed by selecting one channel group from each of the super groups 702, 704, 706, and 708. In the illustrated in FIG. 7, the white list of channel groups includes channel group 712 (from super group 702), channel group 718 (from super group 704), channel group 728 (from super group 706), and channel group 738 (from super group 708). It may be observed that if N=4 and M=4, there may be a total of {4*4*4*3}=192 possibilities of random patterns (e.g., of channel groups corresponding to the white list of channel groups). Thus, an indication of the white list in such a case may require 8 bits. The 8 bits providing the indication may be included in the MIB or a reduced SIB.

In another aspect, an X-bit field in the MIB or reduced SIB may be used to indicate which profile or indication method white list uses.

Figure 8:
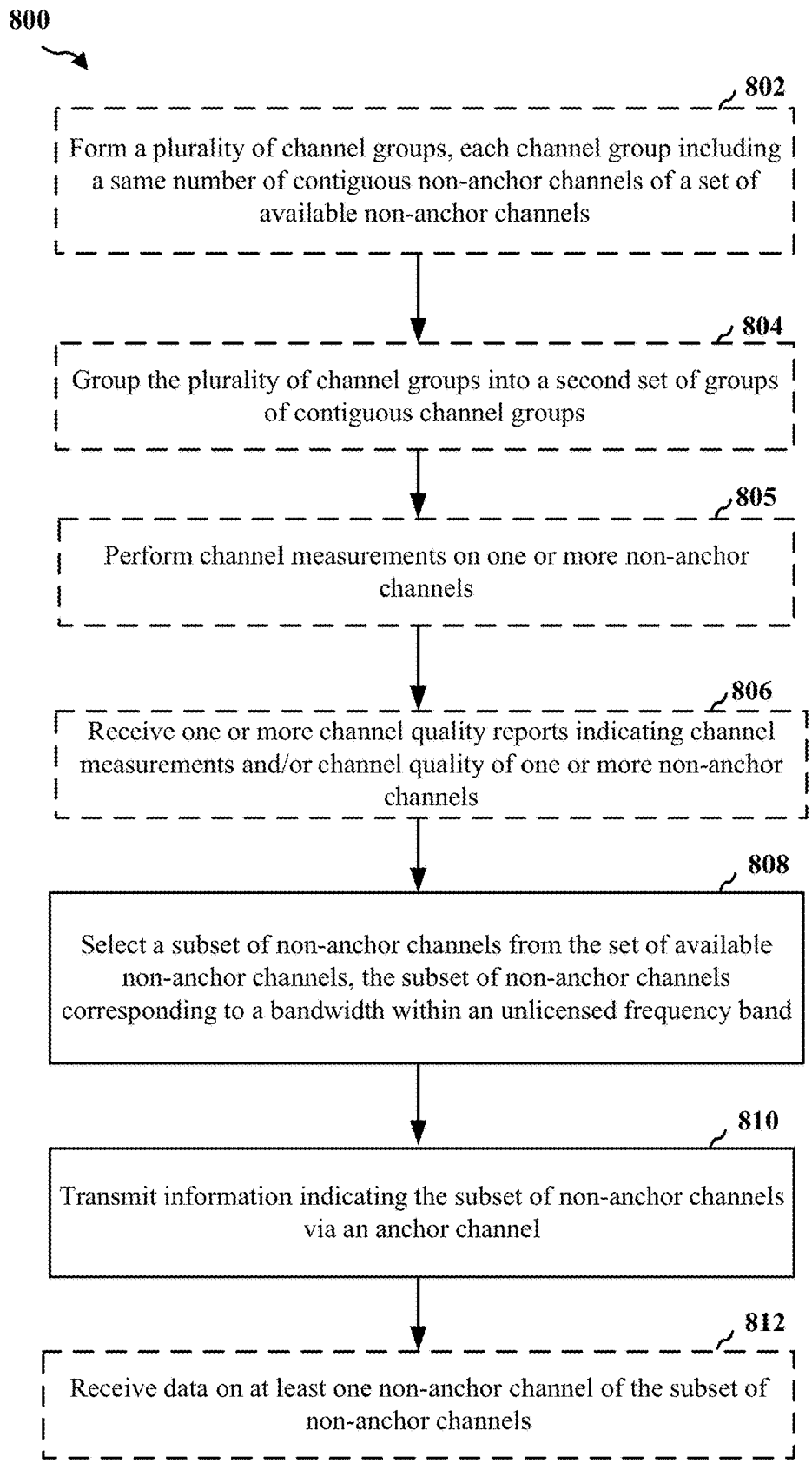
FIG. 8 is a flowchart of a method of wireless communication.

FIG. 8 is a flowchart 800 of an example method of wireless communication in accordance with aspects presented herein. The method may be performed by a base station (e.g., base station 180, 310, the apparatus 902/902'). Some of the operations may be optional as represented by dashed boxes. In one configuration, at 805, the base station may perform channel measurements on one or more non-anchor channels of a set of available non-anchor channels. For example, the base station may measure signal power level on the set of available non-anchor channels. The measurements may be stored for potential use in channel selection in accordance with certain aspects described supra.

In one configuration, at 806, the base station may receive one or more CQI reports from one or more UEs indicating channel quality of one or more non-anchor channels. For example, a UE may perform channel measurements to determine channel quality corresponding to one or more non-anchor channels and generate the one or more CQI reports for the base station to providing information indicating the channel quality. The received CQI reports and/or measurements may be stored for potential use in channel selection in accordance with certain aspects described supra.

At 808, the base station may select a subset of non-anchor channels from a set of available non-anchor channels. In some configurations, the subset of non-anchor channels may correspond to a bandwidth within an unlicensed frequency band. For example, the unlicensed band may be the 2.4 GHz frequency band, the bandwidth associated with the set of available non-anchor channels may be the 80 MHz band within the 2.4 GHz band (e.g., as illustrated in FIG. 5), and the bandwidth associated with the subset of non-anchor channels may be a band within the 80 MHz band. In some configurations, the bandwidth associated with the subset of non-anchor channels may be used for eMTC and/or narrowband communications (e.g., by eMTC and/or IoT devices). As discussed in more detail supra, the subset of non-anchor channels may include a plurality of clean/clear non-anchor channels that may be selected by the base station out of the available non-anchor channels, e.g., based on channel measurements or another base station selected criteria. The channel measurements may be performed by the base station (e.g., as discussed above in connection with block 805) and/or one or more UEs (e.g., as discussed above in connection with block 806). In the case that one or more UEs perform channel measurements, the UEs may be configured to report the measurement reports (e.g., CQI reports) to the base station.

In some configurations, based on the channel measurements the base station may choose the subset of non-anchor channels that have the best measured channel quality and/or least amount of interference/noise. In some other configurations, the base station may choose the subset of non-anchor channels based on a different criteria, e.g., random selection of channels from the available set of non-anchor channels. The selected subset of non-anchor channels may be a part of a white list of non-anchor channels, e.g., channels that are determined by the base station to be usable for data transmission by eMTC and/or narrowband devices. In one particular implementation, the set of available non-anchor channels may include 60 non-anchor channels and the subset of the subset of non-anchor channels may include 15/16 non-anchor channels. In other implementations, the set of available non-anchor channels may include more or less than 60 non-anchor channels. Similarly, the subset of non-anchor channels may be based on a different number than 15 or 16.

At 810, the base station may transmit information, e.g., to a UE, indicating the subset of non-anchor channels via an anchor channel. In some configurations, the anchor channel may be a fixed frequency channel known to the eMTC devices before system acquisition. In some configurations, the anchor channel may be determined via frequency scan or searcher process. The eMTC devices may tune to the anchor channel upon powering up for initial synchronization and acquiring system information. Thus, when the base station provides an indication of the usable non-anchor channels on the anchor channel, the eMTC devices may acquire the information indicating the non-anchor channels that may be used, e.g., for data transmission, along with other system information during the initial acquisition. In some configurations, the information indicating the subset (e.g., white list) of non-anchor channels may be in the form of a bitmap.

In some configurations, at 812, the base station may receive data from the UE on at least one non-anchor channel of the subset of the non-anchor channels. In some configurations, the UE may be an eMTC type device and the received data may be eMTC data.

As discussed supra, it may be noted that the channel bandwidth of channels used for Wi-Fi and ZigBee compliant communications may be larger than the channel width of eMTC-U non-anchor channels. In some deployment scenarios where the main interference is from Wi-Fi and ZigBee technologies, it may be better suited to group non-anchor channels into channel groups. In accordance with an aspect, in some configurations, a number of contiguous 1.4 MHz channels may be grouped into one channel group. In some such configurations, at 802 the base station may form a plurality of channel groups, where each channel group may include a same number of contiguous non-anchor channels of the set of available non-anchor channels. For example, with reference to FIG. 5, the available non-anchor channels may be grouped in the manner shown in drawing 500, with each channel group including 4 contiguous channels (N=4). Continuing with the example of FIG. 5, assuming the full set of available non-anchor channels includes 60 channel, the plurality of channel groups may include 15 channel groups with each group including 4 contiguous channels. In some configurations, the subset of non-anchor channels may be based on selecting a set of channel groups (e.g., channel groups 504, 508, 514, and 530 of FIG. 5) corresponding to the subset of non-anchor channels. In such an example, the set of channel groups that includes the subset of usable non-anchor channels may be a part of a white list of channel groups. In some such configurations, the information indicating the subset of non-anchor channels may indicate the set of channel groups of the plurality of channel groups, and the subset of non-anchor channels corresponds to channels in the set of channel groups. In some such configurations, the set of channel groups is indicated in a master information block using 11 bits. For example, the information indicating a white list of channels corresponding to the set of channel groups may comprise 11 bits that may be included in the MIB.

In some eMTC-U deployment scenarios, only Wi-Fi interference may be observed.

In some such deployments, white list granularity of less than 22 MHz may not be very useful and the white list may be limited to a set of 15/16 contiguous non-anchor channels. In one such configuration, the set of channel groups may include 4 contiguous channel groups, and the information indicating the subset of non-anchor channels may indicate a starting position of a first group in the set of 4 contiguous channel groups that comprise the subset of non-anchor channels. For example, with reference to FIG. 6, the plurality of channel groups may include the channel groups 602 through 630 and the set of channel groups (e.g., including the subset of non-anchor channels) may include the set of channel groups 604, 606, 608, and 610. Thus, in the example the non-anchor channels corresponding to the white list may be included in the set of contiguous channel groups 604, 606, 608, 610, with each channel group including 4 contiguous non-anchor channels (assuming N=4). With N=4, the total number of channel groups is 15 (e.g., considering a total of 60 channels) and only twelve (12) starting positions may be possible for the first channel group in the set of 4 contiguous channel groups of the white list channels. In such a case, the starting position of the first channel group (604) of the white list of channel groups (604, 606, 608, 610) may be signaled by the base station 180 to the eMTC devices (e.g., UEs 104) at 810. On the receiver side, a UE receiving the starting position of the first channel group may be able to determine/identify the remaining channel groups corresponding to the white list based on the indicated starting position of the first channel group because the selected channels correspond to channel groups that are contiguous. In other words, if the subset of non-anchor channels corresponding to the white list include 16 contiguous channels, only twelve starting positions may be possible for the first non-anchor channel of the subset of non-anchor channels that includes 16 contiguous channels. In some configurations, the base station may communicate the starting position of the first non-anchor channel/channel group out of 12 possible starting positions, using 4 bits. The 4 bits indicating the starting position may be included in the MIB or a reduced SIB communicated on an anchor channel. A UE receiving such an indication may be able to determine the subset of non-anchor channels that are selected for data transmission.

In one configuration, at 804 the base station may group the plurality of channel groups into a second set of groups of contiguous channel groups. The second set of groups may also be referred to herein as a set of super groups that are formed out of the plurality of available channel groups. For example, with reference to FIG. 7, the base station may group M contiguous channel groups of non-anchor channels into super groups 702, 704, 706, and 708. In the illustrated example, M=4 as each of the super groups includes 4 contiguous channel groups. In one such configuration, the subset of non-anchor channels may be selected based on selecting a single channel group from each of the (super) groups of contiguous channel groups in the second set of groups. For example, in one configuration, a white list of channel groups (e.g., including 4 channel groups) may be formed by selecting one channel group from each of the super groups 702, 704, 707, and 708. In the example, the white list of channel groups may include channel groups 712, 718, 728, and 738. As discussed earlier in connection with FIG. 7, in an example case with N=4 and M=4, there may be a total of 192 possibilities of random patterns (e.g., of channel groups corresponding to the white list of channel groups) and indicating the white list (e.g., comprising the subset of channels corresponding to the channel groups 712, 718, 728, and 738) in such a case may require 8 bits. In some configurations, the 8 bits providing the indication of the white list may be included in the MIB or a reduced SIB. Thus, in such a configuration, the information indicating the subset of non-anchor channels (transmitted at 810) may comprise 8 bits indicating the selected non-anchor channel groups.

Figure 9:
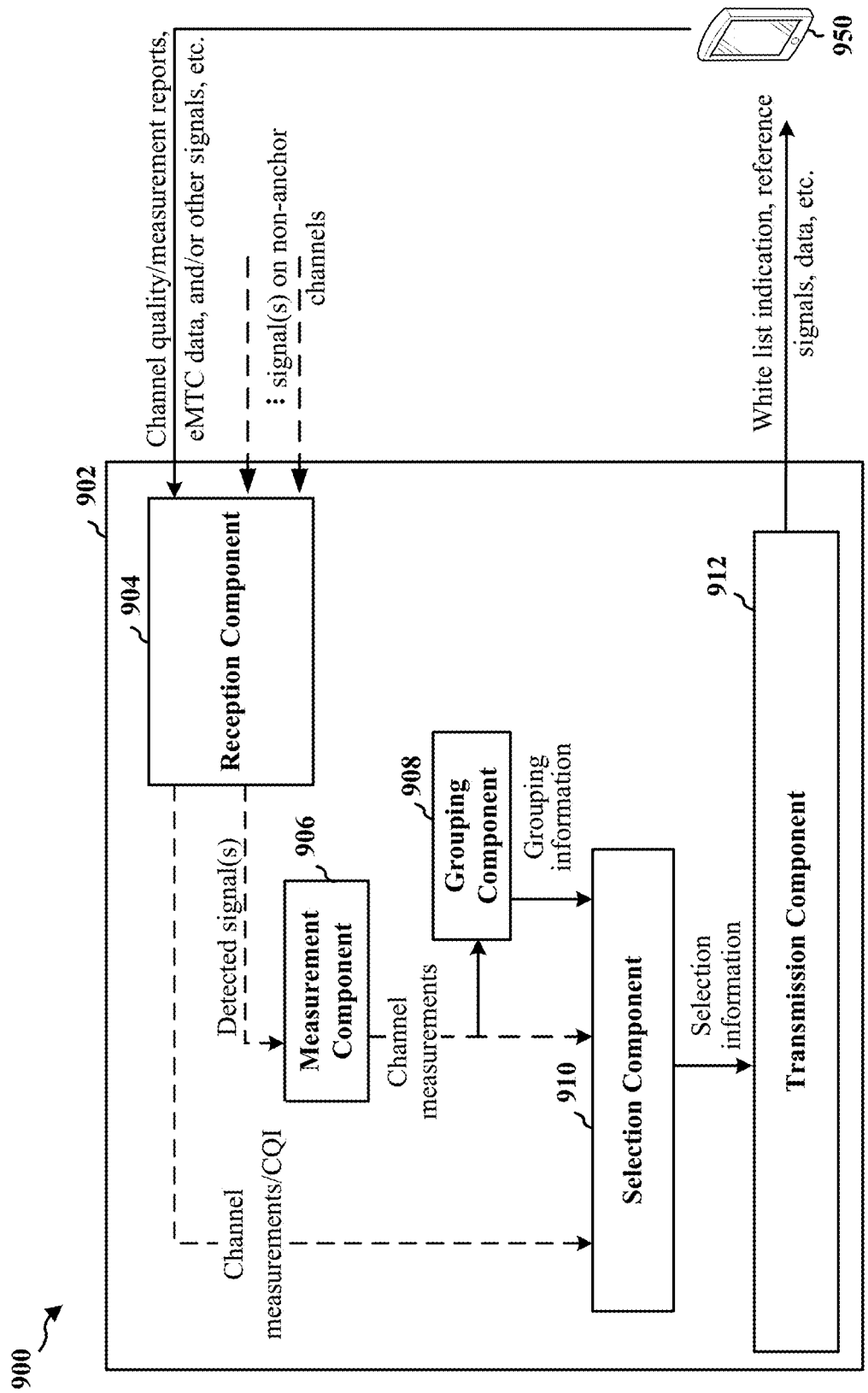
FIG. 9 is a conceptual data flow diagram illustrating the data flow between different means/components in an exemplary apparatus.

FIG. 9 is a conceptual data flow diagram 900 illustrating the data flow between different means/components in an example apparatus 902. The apparatus 902 may be a base station (e.g., such as base station 102, 180, 310). The apparatus 902 may include a reception component 904, a measurement component 906, a grouping component 908, a selection component 910, and a transmission component 912.

The reception component 904 may be configured to receive signals and/or other information from other devices including, e.g., UE 950. The signals/information received by the reception component 904 may be provided to one or more components of the apparatus 902 for further processing and use in performing various operations in accordance with the methods discussed supra including the method of flowchart 800. In some configurations, the reception component 904 may receive channel quality (e.g., CQI) reports indicating channel quality and/or channel measurements corresponding to one or more non-anchor channels from a UE (e.g., UE 950). In one configuration, the reception component 904 may be configured to receive data from the UE 950 transmitted on one or more non-anchor channels indicated by the base station to be used for data transmission. The reception component 904 may be further configured to detect signals on the available non-anchor channels in the unlicensed spectrum from one or more sources. For example, the reception component may monitor to detect signals from, e.g., Wi-Fi devices, ZigBee devices and similar inference sources that operate/communicate using one or more channels/bands within the 2.4 GHz frequency band.

The measurement component 906 may be implemented as a standalone component or as part of the reception component 904. The measurement component 906 may be configured to perform channel measurements on a set of available non-anchor channels as discussed supra in more detail. For example, the measurement component 906 may be configured to measure signal power level on the set of available non-anchor channels. The channel measurements may be performed to measure noise and/or interference from various sources on the available non-anchor channels to determine which channels are clear or have the least amount of noise/interference. The channel measurements may be stored in the apparatus 902, and may be provided to the selection component 910 for possible use in selection of a subset of non-anchor channels in some configurations.

The grouping component 908 may be configured to form a plurality of channel groups out of the of the set of available non-anchor channels. In some configurations, the grouping component 908 may form the plurality of channel groups such that each channel group may include a same number of contiguous non-anchor channels of the set of available non-anchor channels. In one configuration, the plurality of channel groups may include 15 channel groups. In one configuration, the grouping component 908 may be configured to group the plurality of channel groups into a second set of groups of contiguous channel groups. For example, the second set of groups may be a set of super groups that are formed out of the plurality of available channel groups. For example, with reference to FIG. 7, the apparatus 902 may be the base station 180, and the grouping component 908 may group M contiguous channel groups (shown in FIG. 7) of non-anchor channels into super groups 702, 704, 706, and 708.

The selection component 910 may be configured to select the subset of non-anchor channels from the set of available non-anchor channels in accordance with the methods discussed supra. For example, in one configuration, the selection component 910 may select the subset of non-anchor channels based on channel measurements on the available non-anchor channels performed by the apparatus 902 (e.g., using the measurement component 906). In some other configurations, the selection component 910 may select the subset of non-anchor channels based on channel measurements performed by one or more UEs (e.g., including UE 950) that may report their channel measurements and/or channel quality reports to the apparatus 902. In still some configurations, the selection component 910 may select the subset of non-anchor channels of the white list based on both the channel measurements provided by the measurement component 906 and the channel measurements reports received from the UE 950. In still one other configuration, the selection component 910 may randomly select the subset of non-anchor channels from the available set of non-anchor channels.

In some configurations, where the apparatus 902 may be configured form a plurality of channel groups out of the set of available non-anchor channel, the selected subset of non-anchor channels may correspond to a set of channel groups of the plurality of channel groups, with each channel group having including a same number of contiguous non-anchor channels. In some configurations, where the apparatus 902 may be configured to group the plurality of channel groups into a second set of groups of contiguous channel groups, the selection component 910 may select the subset of non-anchor channels by selected a single channel group from each of the groups of contiguous channel groups in the second set of groups as discussed in more detail supra. In various configurations, the selection component 908 provide selection information regarding the selected subset of non-anchor channels (e.g., channels or channel groups) to the transmission component 912.

The transmission component 912 may be configured to generate and transmit various signals and messages to one or more external devices, e.g., including UE 950, in accordance with the methods disclosed herein. For example, in some configurations, the transmission component 912 may be configured to transmit information indicating the subset of non-anchor channels (selected as discussed above) via an anchor channel to the UE 950. The anchor channel over which the information may be transmitted may be a channel known to the UE 950 and having a fixed center frequency. In other words, the transmission component 912 may be configured to transmit a white list comprising the selected subset of non-anchor channels. The selected subset (e.g., white list) of non-anchor channels may identify the channels that may be suitable for eMTC data transmission. In one configuration, the subset of non-anchor channels may include 16 contiguous non-anchor channels, and the transmitted information indicating the subset of non-anchor channels may indicate a starting position of a first non-anchor channel of the 16 contiguous non-anchor channels. In some configurations, the information indicating the subset of non-anchor channels may be transmitted in at least one of an MIB or a reduced SIB via the anchor channel.

In some configurations, where the apparatus 902 may be configured form a plurality of channel groups out of the set of available non-anchor channel, the information indicating the subset of non-anchor channels may indicate a set of channel groups of the plurality of channel groups. In such a case, the selected subset of non-anchor channels may correspond to the channels in the set of channel groups. In some configurations, where the apparatus 902 may be configured to group the plurality of channel groups into a second set of groups of contiguous channel groups (e.g., set of super groups), the transmitted information indicating the subset of non-anchor channels may indicate the selected non-anchor channel groups from the second set of groups of contiguous channel groups. In such a case, the selected subset of non-anchor channels may correspond to channels in the non-anchor channel groups from the second set.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
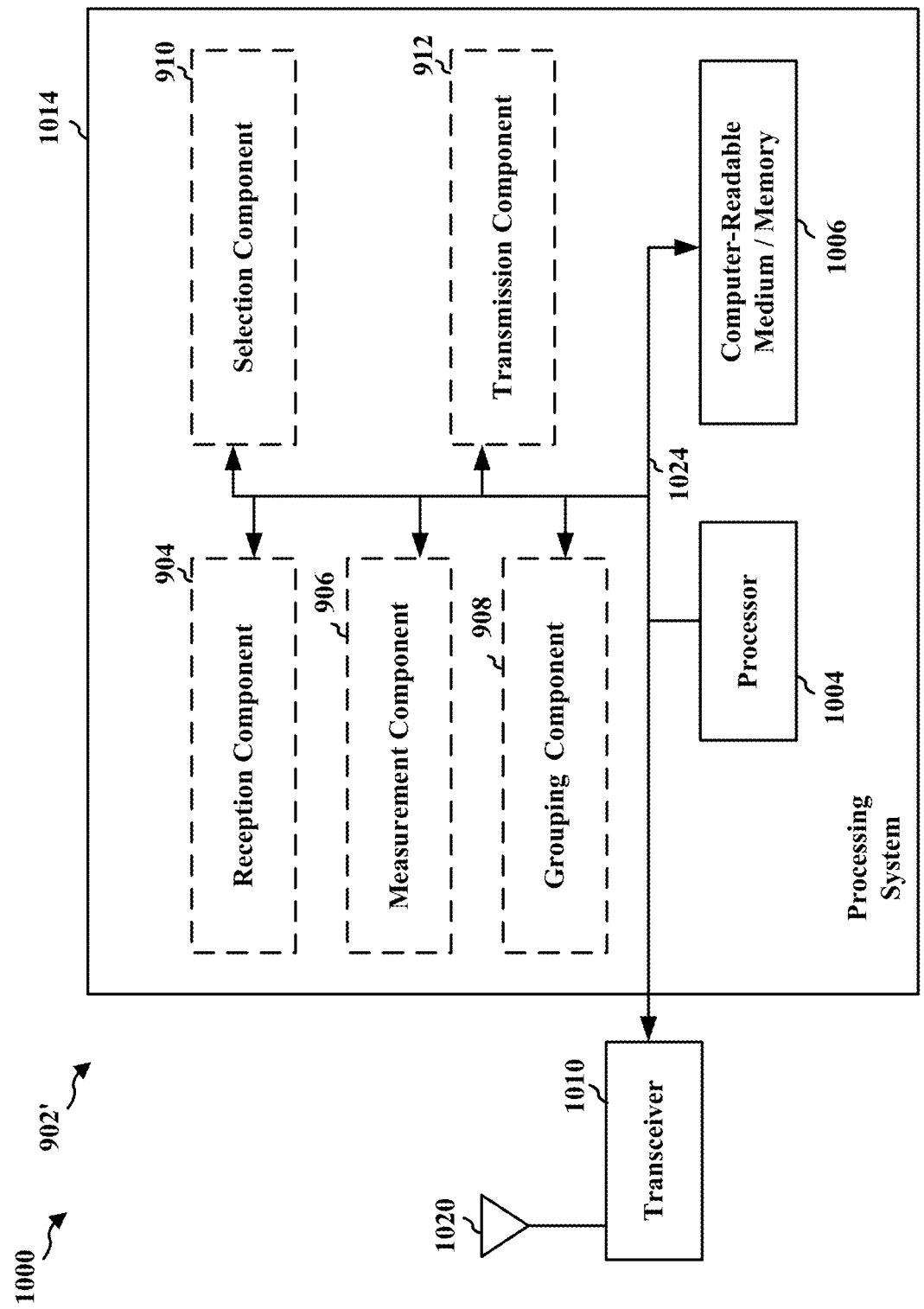
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer-readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375.

In one configuration, the apparatus 902/902' for wireless communication includes means for selecting a subset of non-anchor channels from a set of available non-anchor channels, wherein the subset of non-anchor channels corresponds to a bandwidth within an unlicensed frequency band. In some configurations, the apparatus may further include means for performing channel measurements on one or more non-anchor channels. In some configurations, the apparatus may further comprise means for receiving one or more channel quality reports indicating channel measurements and/or channel quality of one or more non-anchor channels. The apparatus may further include means for transmitting information indicating the subset of non-anchor channels via an anchor channel. In some configurations, the apparatus may further include means for forming a plurality of channel groups, wherein each channel group includes a same number of contiguous non-anchor channels of the set of available non-anchor channels. In some configurations, the information indicating the subset of non-anchor channels indicates a set of channel groups of the plurality of channel groups, the subset of non-anchor channels corresponding to channels in the set of channel groups.

In some configurations, the means for forming the plurality of channel groups may be further configured to group the plurality of channel groups into a second set of groups of contiguous channel groups, and wherein the subset of non-anchor channels is selected based on selecting a single channel group from each of the groups of contiguous channel groups in the second set of groups. In some configurations, the means for receiving may be further configured to receive data on one or more non-anchor channels of the subset of non-anchor channels.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
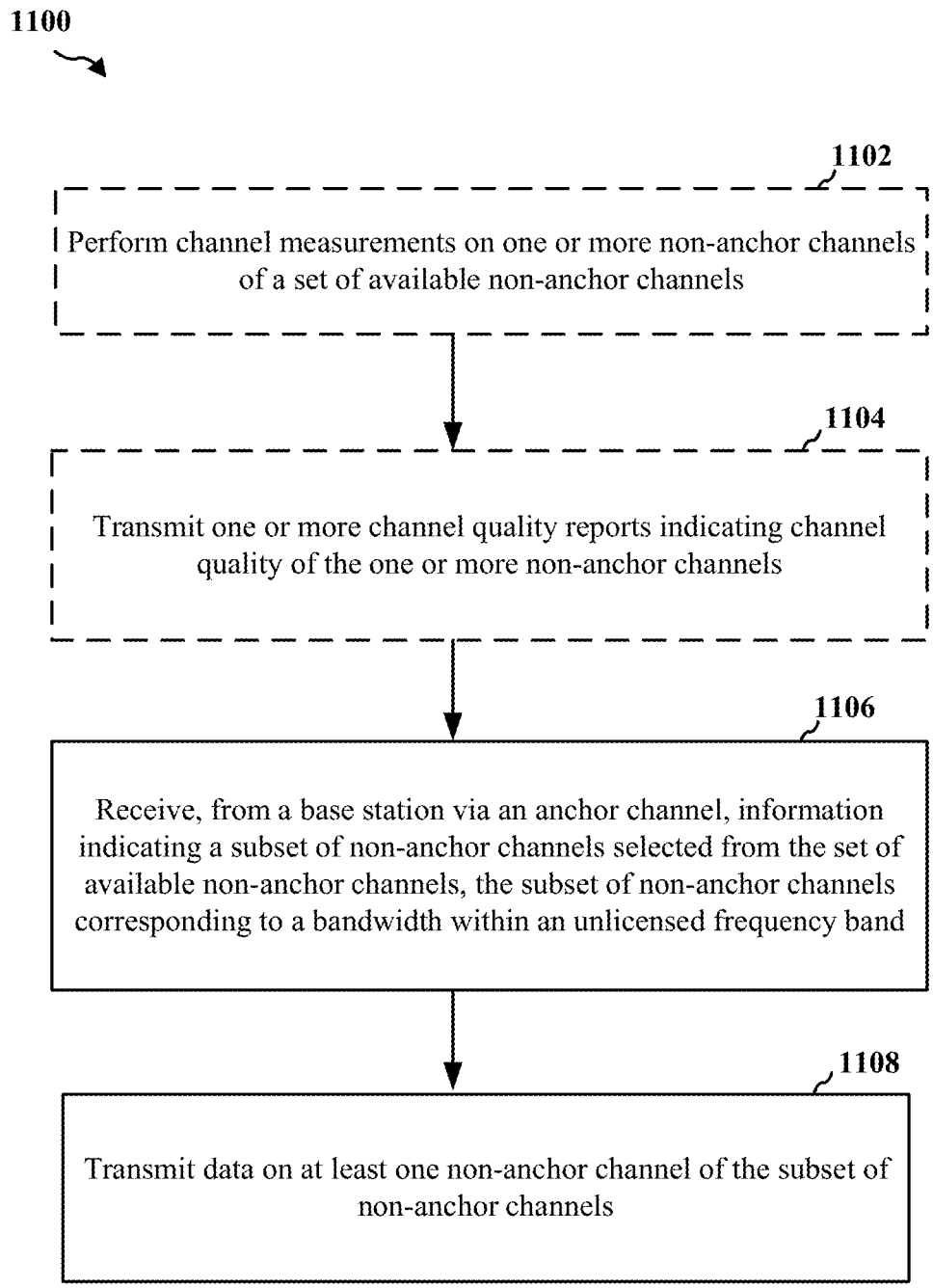
FIG. 11 is a flowchart of another example method of wireless communication.

FIG. 11 is a flowchart 1100 of an example method of wireless communication in accordance with aspects presented herein. The method may be performed by a UE (e.g., UE 104, 350, 950, the apparatus 1202/1202'). Some of the operations may be optional as represented by dashed boxes. In one configuration, the UE may be aware of a set of available non-anchor channels that may be used for eMTC, and at 1102 may perform channel measurements on one or more non-anchor channels of the set of available non-anchor channels. For example, the UE may measure power level on one or more channels of the set of available non-anchor channels to detect noise and/or interference from interfering sources. In some configurations, as part of the operation at bock 1102, the UE may generate one or more channel quality reports (e.g., CQI reports) indicating channel quality of the one or more non-anchor channels of the set of available non-anchor channels.

At 1104, the UE may transmit the one or more channel quality reports indicating the channel quality of the one or more non-anchor channels to a base station (e.g., base station 180, 310, the apparatus 902). The channel quality reports and/or channel measurements may be transmitted to the base station for potential use by the base station in selecting clean/clear non-anchor channels as discussed in greater detail supra.

At 1106, the UE may receive, from the base station via an anchor channel, information indicating a subset of non-anchor channels selected from the set of available non-anchor channels. In various configurations, the subset of non-anchor channels may correspond to a bandwidth within an unlicensed frequency band (e.g., 2.4 GHz band). As discussed supra, in some configurations, the subset of non-anchor channels may be selected by the base station from the set of available non-anchor channels based on the channel measurements performed by the base station and/or channel quality reports corresponding to the non-anchor channels received from the UE. In some other configurations, the subset of non-anchor channels may be randomly selected by the base station and indicated to the UE. In some configurations, the information indicating the subset of non-anchor channels may be included within at least one of an MIB or a reduced SIB, that may be received by the UE via the anchor channel. In some configurations, the anchor channel may be a fixed frequency channel known to the UE before system acquisition. The UE may tune to the anchor channel upon powering up for initial synchronization and acquiring system information, and may also do so periodically.

In some configurations, the subset of non-anchor channels indicated to the UE may include 16 contiguous non-anchor channels, and the information indicating the subset of non-anchor channels may indicate a starting position of a first non-anchor channel of the 16 contiguous non-anchor channels. In some configurations, the information indicating the subset of non-anchor channels may indicate (e.g., identify) a set of channel groups from a plurality of channel groups, and the subset of non-anchor channels (selected for the UE) may correspond to the channels in the set of channel groups. In some such configurations, each channel group may include a same number of contiguous non-anchor channels. For example, with reference to FIG. 5, the available non-anchor channels may be grouped in the manner shown in drawing 500, with each channel group including 4 contiguous channels. In some configurations, the subset of non-anchor channels may be based on selecting the set of channel groups (e.g., channel groups 504, 508, 514, and 530 of FIG. 5) that may include clean/clear non-anchor channels. In such an example, the information indicating the subset of non-anchor channels may indicate the set of channel groups (e.g., groups 504, 508, 514, and 530), and the subset of non-anchor channels may correspond to channels in the set of channel groups. In some such configurations, the information indicating the set of channel groups (comprising the base station selected subset of non-anchor channels) is received in an MIB or a reduced SIB as discussed supra. In some examples, this information may be indicated in the MIB e.g., via 11 bits.

In one configuration, the information indicating the subset of non-anchor channels may indicate a starting position of a first group in a set of contiguous channel groups, and the subset of non-anchor channels may correspond to the channels in the set of contiguous channel groups. In one configuration, the set of contiguous channel groups may include 4 contiguous channel groups. In one configuration, each channel group may include 4 non-anchor channels. For example, with reference to FIG. 6, the channels corresponding to the set of 4 contiguous channel groups 604, 606, 608, and 610 may comprise the subset of non-anchor channels selected by the base station for the UE. In such a case, in one configuration, the information indicating the subset of non-anchor channels received by the UE (at 1106) may indicate a starting position of the first group 604 in the set of contiguous channel groups, and the UE may determine that it can use the non-anchor channels corresponding to the channel groups 604, 606, 608, and 610.

Having received the information indicating which non-anchor channels and/or channel groups to use, at 1108, the UE may transmit data on at least one non-anchor channel of the indicated subset of non-anchor channels. In one example, the UE (e.g., UE 104) may be a narrowband IoT device or eMTC device, and may transmit eMTC data on one or more non-anchor channels. The data may be transmitted using one or more non-anchor channel of the indicated subset of non-anchor channels to the base station and/or another UE.

Figure 12:
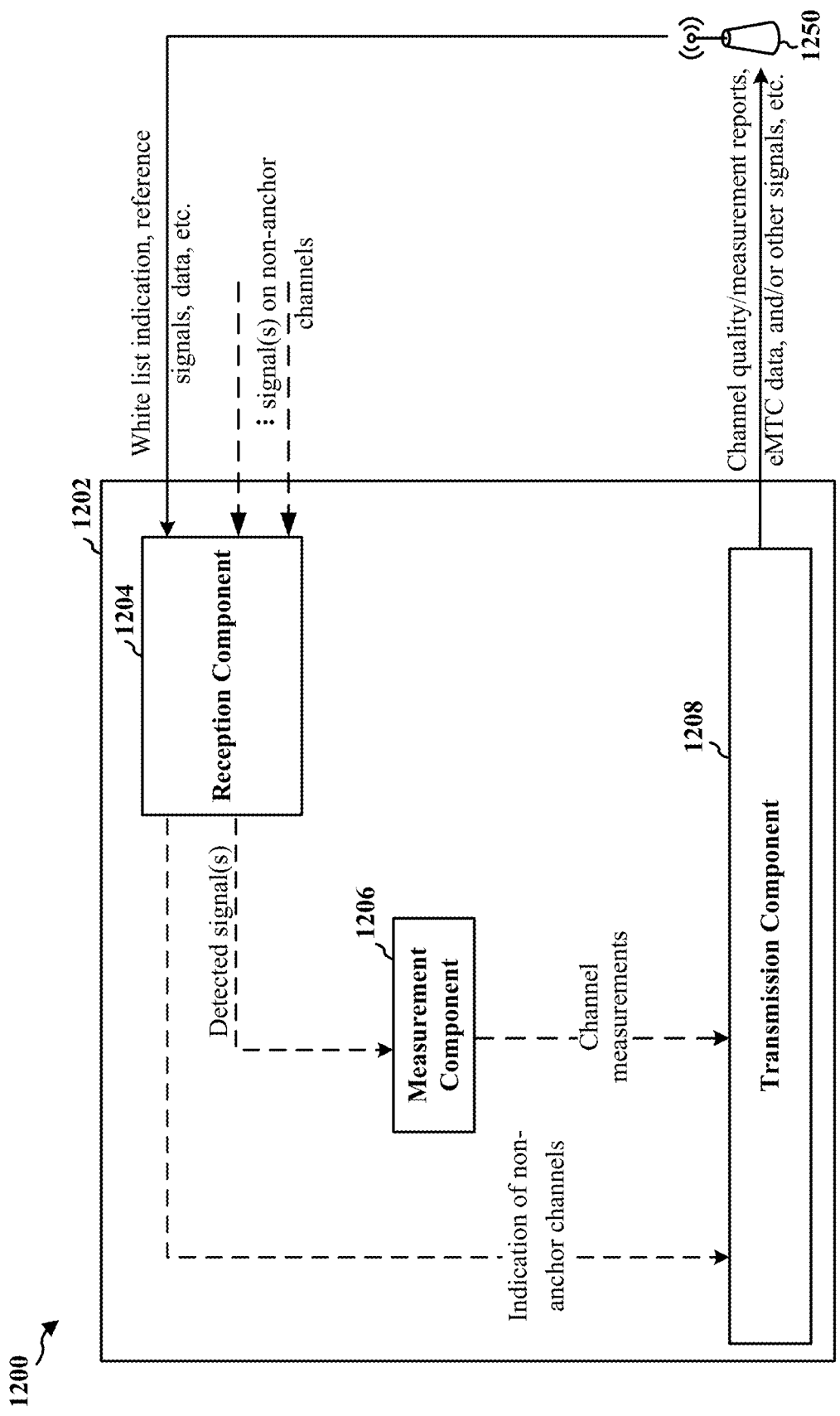
FIG. 12 is a conceptual data flow diagram illustrating the data flow between different means/components in an exemplary apparatus.

FIG. 12 is a conceptual data flow diagram 1200 illustrating the data flow between different means/components in an example apparatus 1202. The apparatus 1202 may be a UE (e.g., such as UE 104, 350, 950). The apparatus 1202 may include a reception component 1204, a measurement component 1206, and a transmission component 1208.

The reception component 1204 may be configured to receive signals and/or other information from other devices including, e.g., base station 1250. The signals/information received by the reception component 1204 may be provided to one or more components of the apparatus 1202 for further processing and use in performing various operations in accordance with the methods discussed supra including the method of flowchart 1100. In some configurations, the reception component 1204 may be configured to detect signals on the available non-anchor channels in the unlicensed spectrum from one or more sources. For example, the reception component 1204 may monitor to detect signals from, e.g., Wi-Fi devices, ZigBee devices and similar inference sources that operate/communicate using one or more channels/bands within the 2.4 GHz frequency band.

The measurement component 1206 may be implemented as a standalone component or as part of the reception component 1204. The measurement component 1206 may be configured to perform channel measurements on a set of available non-anchor channels. For example, the measurement component 1206 may be configured to measure power level detected on the set of available non-anchor channels. The channel measurements may be performed to measure noise and/or interference from various sources on the available non-anchor channels to determine channel quality of the various available non-anchor channels. The channel measurements may be stored in the apparatus 1202, and/or may be provided to the transmission component 1208.

In some configurations, the reception component 1204 may be further configured to receive, from a base station (e.g., base station 1250) via an anchor channel, information indicating a subset of non-anchor channels selected from the set of available non-anchor channels. In some configurations, the subset of non-anchor channels may correspond to a bandwidth within an unlicensed frequency band. In some configurations, the information indicating the subset of non-anchor channels may identify a set of channel groups from a plurality of non-anchor channel groups, and the subset of non-anchor channels may correspond to channels in the set of channel groups. In some such configurations, each channel group may include a same number of contiguous non-anchor channels of the set of available non-anchor channels. In some configurations, the plurality of channel groups may include 15 channel groups and the set of channel groups may include 4 channel groups. In some configurations, the information indicating the set of channel groups is indicated in an MIB, e.g., using 11 bits.

In some configurations, the information indicating the subset of non-anchor channels may indicate a starting position of a first channel group in a set of contiguous channel groups, and the subset of non-anchor channels may correspond to channels in the set of contiguous channel groups. In some such configurations, the set of contiguous channel groups may include 4 contiguous channel groups. In some configurations, the subset of non-anchor channels may include 16 contiguous non-anchor channels, and the information indicating the subset of non-anchor channels may indicate a starting position of a first non-anchor channel of the 16 contiguous non-anchor channels. In some configurations, the information indicating the subset of non-anchor channels may be included within at least one of an MIB or a reduced SIB (e.g., carrying fewer bits) that may be received by the reception component 1204 over the anchor channel.

The transmission component 1208 may be configured to generate and transmit various signals and messages to one or more external devices, e.g., including the base station 1250, in accordance with the methods disclosed herein. For example, in some configurations, the transmission component 1208 may be configured to generate one or more channel quality reports (e.g., CQI reports) based on the channel measurements performed by the measurement component 1206. In some configurations, the transmission component 1208 may transmit the one or more channel quality reports indicating channel quality and/or channel measurements corresponding to the one or more non-anchor channels, e.g., to the base station 1250. In some configurations, the transmission component 1208 may be further configured to transmit data on one or more non-anchor channels of the indicated subset of non-anchor channels.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
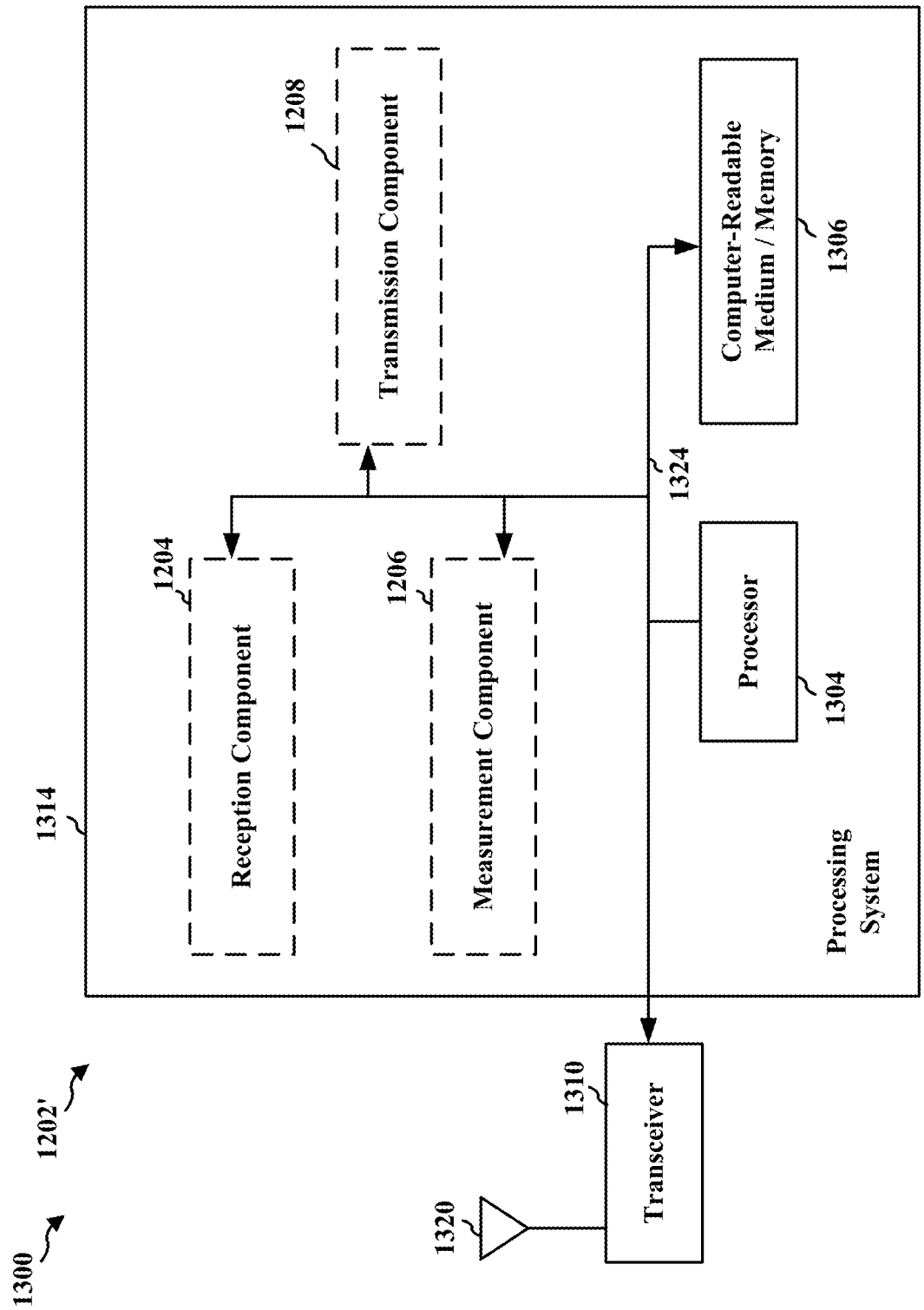
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208. The components may be software components running in the processor 1304, resident/stored in the computer-readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication is a UE, and may include means for receiving, from a base station via an anchor channel, information indicating a subset of non-anchor channels selected from a set of available non-anchor channels. In one configuration, the subset of non-anchor channels may correspond to a bandwidth within an unlicensed frequency band. In some configurations, the apparatus may further comprise means for transmitting data on at least one non-anchor channel (e.g., on one or more channels) of the subset of non-anchor channels. In some configurations, the information indicating the subset of non-anchor channels identifies a set of channel groups from a plurality of channel groups, and the subset of non-anchor channels corresponding to channels in the set of channel groups. In some such configurations, each channel group may include a same number of contiguous non-anchor channels of the set of available non-anchor channels.

In some configurations, the apparatus may further comprise means for performing channel measurements on one or more non-anchor channels of the set of available non-anchor channels. In some configurations, the means for transmitting may be further configured to generate and transmit one or more channel quality reports indicating channel quality of one or more non-anchor channels of the set of available non-anchor channels. In some configurations, the channel quality may be determined based on the channel measurements performed on the one or more non-anchor channels.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, from a base station via an anchor channel, information indicating a subset of non-anchor channels selected from a set of available non-anchor channels, wherein the subset of non-anchor channels corresponds to a bandwidth within an unlicensed frequency band, further wherein the information indicating the subset of non-anchor channels identifies a set of channel groups from a plurality of channel groups, the subset of non-anchor channels corresponding to channels in the set of channel groups, each channel group including a same number of contiguous non-anchor channels of the set of available non-anchor channels; and
   transmitting data on at least one non-anchor channel of the subset of non-anchor channels.

2. The method of claim 1, wherein the plurality of channel groups includes 15 channel groups and the set of channel groups includes 4 channel groups.

3. The method of claim 1, wherein the set of channel groups is indicated in a master information block using 11 bits.

4. The method of claim 1, further comprising:
   transmitting one or more channel quality reports indicating channel quality of one or more non-anchor channels of the set of available non-anchor channels.

5. The method of claim 1, wherein the subset of non-anchor channels indicated in the received information is selected from the set of available non-anchor channels based on channel measurements.

6. The method of claim 1, wherein the information indicating the subset of non-anchor channels indicates a starting position of a first group in a set of contiguous channel groups, the subset of non-anchor channels corresponding to channels in the set of contiguous channel groups.

7. The method of claim 6, wherein the set of contiguous channel groups includes 4 contiguous channel groups.

8. The method of claim 1, wherein the subset of non-anchor channels includes 16 contiguous non-anchor channels, and wherein the information indicating the subset of non-anchor channels indicates a starting position of a first non-anchor channel of the 16 contiguous non-anchor channels.

9. The method of claim 1, wherein the information indicating the subset of non-anchor channels is included within at least one of a master information block or a reduced system information block received via the anchor channel.

10. An apparatus for wireless communication, comprising:
    a memory; and
    at least one processor coupled to the memory and configured to:
       receive, from a base station via an anchor channel, information indicating a subset of non-anchor channels selected from a set of available non-anchor channels, wherein the subset of non-anchor channels corresponds to a bandwidth within an unlicensed frequency band, the information indicating the subset of non-anchor channels identifying a set of channel groups from a plurality of channel groups, the subset of non-anchor channels corresponding to channels in the set of channel groups, each channel group including a same number of contiguous non-anchor channels of the set of available non-anchor channels; and
       transmit data on at least one non-anchor channel of the subset of non-anchor channels.

11. The apparatus of claim 10, wherein the plurality of channel groups includes 15 channel groups and the set of channel groups includes 4 channel groups; and
    wherein the set of channel groups is indicated in a master information block using 11 bits.

12. The apparatus of claim 10, wherein the at least one processor is further configured to transmit one or more channel quality reports indicating channel quality of one or more non-anchor channels of the set of available non-anchor channels.

13. The apparatus of claim 10, wherein the information indicating the subset of non-anchor channels indicates a starting position of a first group in a set of contiguous channel groups, the subset of non-anchor channels corresponding to channels in the set of contiguous channel groups.

14. A method of wireless communication of a base station, comprising:
    selecting a subset of non-anchor channels from a set of available non-anchor channels, wherein the subset of non-anchor channels corresponds to a bandwidth within an unlicensed frequency band;
    forming a plurality of channel groups, each channel group including a same number of contiguous non-anchor channels of the set of available non-anchor channels; and
    transmitting information indicating the subset of non-anchor channels via an anchor channel, wherein the information indicating the subset of non-anchor channels indicates a set of channel groups of the plurality of channel groups, the subset of non-anchor channels corresponding to channels in the set of channel groups.

15. The method of claim 14, wherein the subset of non-anchor channels is selected from the set of available non-anchor channels based on channel measurements performed by the base station.

16. The method of claim 14, wherein the subset of non-anchor channels is selected from the set of available non-anchor channels based on channel measurements performed by a UE, the channel measurements performed by the UE being indicated in one or more channel quality reports from the UE, the method further comprising:
    receiving the one or more channel quality reports from the UE.

17. The method of claim 14, wherein the plurality of channel groups includes 15 channel groups and the set of channel groups includes 4 channel groups.

18. The method of claim 14, wherein the set of channel groups is indicated in a master information block using 11 bits.

19. The method of claim 14,
    wherein the set of channel groups includes 4 contiguous channel groups, and
    wherein the information indicating the subset of non-anchor channels indicates a starting position of a first group in the set of 4 contiguous channel groups.

20. The method of claim 14, wherein the subset of non-anchor channels includes 16 contiguous non-anchor channels, and wherein the information indicating the subset of non-anchor channels indicates a starting position of a first non-anchor channel of the 16 contiguous non-anchor channels.

21. The method of claim 14, further comprising:
grouping the plurality of channel groups into a second set of groups of contiguous channel groups, wherein the subset of non-anchor channels is selected based on selecting a single channel group from each of the groups of contiguous channel groups in the second set of groups.

22. The method of claim 14, wherein the information indicating the subset of non-anchor channels is included within at least one of a master information block or a reduced system information block transmitted via the anchor channel.

23. A base station for wireless communication, comprising:
a memory; and at least one processor coupled to the memory and configured to:
select a subset of non-anchor channels from a set of available non-anchor channels, wherein the subset of non-anchor channels corresponds to a bandwidth within an unlicensed frequency band;
form a plurality of channel groups, each channel group including a same number of contiguous non-anchor channels of the set of available non-anchor channels; and
transmit information indicating the subset of non-anchor channels via an anchor channel, the information indicating the subset of non-anchor channels indicating a set of channel groups of the plurality of channel groups, the subset of non-anchor channels corresponding to channels in the set of channel groups.

24. The base station of claim 23, wherein the at least one processor is further configured to select the subset of non-anchor channels from the set of available non-anchor channels based on channel measurements performed by the base station.

25. The base station of claim 23, wherein the at least one processor is further configured to:
select the subset of non-anchor channels from the set of available non-anchor channels based on channel measurements performed by a UE, the channel measurements performed by the UE being indicated in one or more channel quality reports from the UE; and
receive the one or more channel quality reports from the UE.

26. The base station of claim 23,
wherein the set of channel groups includes 4 contiguous channel groups, and wherein the information indicating the subset of non-anchor channels indicates a starting position of a first group in the set of 4 contiguous channel groups.

* * * * *